United States Patent [19]

Dumain et al.

[11] Patent Number: 5,066,736
[45] Date of Patent: Nov. 19, 1991

[54] GAS-PHASE ALPHA-OLEFIN POLYMERIZATION PROCESS IN THE PRESENCE OF AN ACTIVITY RETARDER

[75] Inventors: Andre Dumain; Jean Engel; Laszlo Havas, all of Martigues, France

[73] Assignee: BP Chemicals Limited, London, England

[21] Appl. No.: 403,187

[22] Filed: Sep. 5, 1989

[30] Foreign Application Priority Data

Sep. 13, 1988 [FR] France .................................. 88 12066
Apr. 27, 1989 [FR] France .................................. 89 05846

[51] Int. Cl.$^5$ .............................. C08F 2/38; C08F 4/24
[52] U.S. Cl. .......................................... 526/82; 526/83; 526/84; 526/85; 526/106; 526/123; 526/158; 526/901
[58] Field of Search .................. 526/82, 83, 84, 85, 526/106, 123, 158, 901

[56] References Cited

U.S. PATENT DOCUMENTS

| | | |
|---|---|---|
| 3,067,190 | 12/1962 | Rottig et al. . |
| 3,562,357 | 2/1971 | Eichenbaum . |
| 4,649,128 | 3/1987 | National Dist. . |
| 4,721,763 | 1/1988 | Bailly et al. .................. 526/125 |

FOREIGN PATENT DOCUMENTS

| | | |
|---|---|---|
| A0004417 | 10/1979 | European Pat. Off. . |
| A0170410 | 2/1986 | European Pat. Off. . |
| A0188914 | 7/1986 | European Pat. Off. . |
| 188914 | 7/1986 | European Pat. Off. . |
| 257316 | 3/1988 | European Pat. Off. . |
| A0301872 | 2/1989 | European Pat. Off. . |
| 0315192 | 5/1989 | European Pat. Off. . |
| 1249025 | 10/1984 | U.S.S.R. . |

OTHER PUBLICATIONS

Translation of SU (USSR) 1249025.
Polymer Science USSR, vol. 22, 1980, pp. 448–454.

*Primary Examiner*—Joseph L. Schofer
*Assistant Examiner*—Tom Weber
*Attorney, Agent, or Firm*—Brooks Haidt Haffner & Delahunty

[57] ABSTRACT

A process for the continuous polymerization of one or more alpha-olefins with a transition metal catalyst, in a reactor having a fluidized and/or mechanically stirred bed, in which a very small amount of an activity retarder, generally less than 0.1 ppm, is introduced continuously into the reactor at a flow rate which is varied with time so as to keep substantially constant either the polymerization rate or the content of transition metal in the polymer produced. Suitable activity retarders include polymerization inhibitors such as, for example, oxygen, alcohols, carbon monoxide and carbon dioxide and electron donor compounds such as amides and ethers.

14 Claims, No Drawings

GAS-PHASE ALPHA-OLEFIN POLYMERIZATION PROCESS IN THE PRESENCE OF AN ACTIVITY RETARDER

The present invention relates to a process for the gas-phase polymerization of an alpha-olefin in a reactor with a fluidized and/or mechanically agitated bed, in the presence of a catalyst based on a transition metal.

It is known to polymerize continuously one or more alpha-olefins, such as ethylene or propylene, in the gas-phase in a reactor with a fluidized and/or mechanically agitated bed, in the presence of a catalyst based on a transition metal belonging to groups IV, V or VI of the Periodic Table of the Elements; in particular in the presence of a catalyst of the Ziegler-Natta type or a catalyst based on chromium oxide. The polymer particles in the process of forming are kept in the fluidized and/or agitated state in a gaseous reaction mixture containing the alpha-olefin or alpha-olefins, which are introduced continuously into the reactor. The catalyst is introduced continuously or intermittently into the reactor while the polymer constituting the fluidized and/or mechanically agitated bed is withdrawn from the reactor, also continuously or intermittently. The heat of the polymerization reaction is essentially removed by the gaseous reaction mixture, which passes through a heat transfer means before being recycled into the reactor.

When a process for the gas-phase polymerization of an alpha-olefin is carried out in the presence of a catalyst of high activity, it has been observed that small variations in the course of the polymerization, resulting for example from slight fluctuations in the quality of the catalyst or the alpha-olefins used in the reaction, can cause changes in the behaviour and the catalytic activity of the polymer particles in the process of forming in the bed. These small variations are known to have a particularly adverse effect in a gas-phase polymerization process because of the fact that the heat exchange capacity of a gas-phase is much lower than that of a liquid-phase. In particular, these small variations can cause an unexpected increase in the amount of heat evolved by the reaction which cannot be removed sufficiently rapidly and efficiently by the gaseous reaction mixture passing through the bed, and can give rise to the appearance of hot spots in the bed, as well as the formation of agglomerates of molten polymer. When hot spots appear in the bed, it is generally too late to prevent the formation of agglomerates. However, if the reaction conditions are corrected sufficiently early, especially by lowering the polymerization temperature or pressure, or reducing the rate at which catalyst is supplied to the reactor in order to restrict the adverse effects of unexpected superactivation, the amount and size of the agglomerates formed can be reduced to a certain extent. During this period, however, it will not be possible to avoid a drop in the polymer production end a deterioration of the quality of the polymer manufactured. Consequently, if it is desired to avoid these disadvantages, the general polymerization conditions are usually chosen with a safety margin such that hot spots and agglomerates cannot form. Nevertheless, the application of such conditions unavoidably results either in a substantial loss of production or in a deterioration of the quality of the polymer manufactured, especially an increase in the proportion of catalyst residues in the polymer.

These superactivation phenomena are likely to occur especially when using a high yield catalyst whose polymerization activity can vary considerably for very small variations in the proportion of impurities in the polymerization medium. This is the case in particular with catalysts of the Ziegler-Natta type based on magnesium, halogen and a transition metal such as titanium, vanadium or zirconium. Such superactivation phenomena can also develop when using comonomers which are capable of activating the polymerization of an alpha-olefin, especially in the case of the copolymerization of ethylene with alpha-olefins containing from 3 to 8 carbon atoms (Polymer Science USSR, vol. 22. 1980, pages 448-454).

Soviet Union Patent No. 1 249 025, discloses a method of controlling alpha-olefin polymerization in gas-phase in the presence of a catalyst, hydrogen and carbon dioxide. The method essentially consists of the adjustment of the melt flow ratio of the polyolefin which is a physical property characterizing the molecular weight distribution of the polymer. The adjustment of the melt flow ratio is carried out by measuring a relatively high concentration of carbon dioxide in the reactor and by changing the flow rate of carbon dioxide which induces a change in the specific efficiency of the polymerisation catalyst. However, this method does not describe a process for keeping substantially constant either the polymerization rate or the catalyst content in the polyolefin produced.

A process for the gas-phase polymerization of an alpha-olefin has now been found which makes it possible to overcome, or at least mitigate, the above-mentioned disadvantages. In particular, the process makes it possible to manufacture polymers continuously, with a high productivity and a low content of catalyst residues, without concern for the unavoidable slight variations in the quality of the alpha-olefins or the catalyst or in the supply of catalyst to the reactor.

It is found that, by virtue of this process, it is now possible to produce continuously a polymer of a constant and satisfactory quality, with a high degree of reproducibility and high yield, without forming agglomerates.

The present invention therefore relates to a process for the continuous gas-phase polymerization of one or more alpha-olefins in a reactor having a fluidized and/or mechanically stirred bed, with the aid of a catalyst and an activity retarder, characterized in that the polymerization is carried out by bringing a catalyst based on a transition metal belonging to Groups IV, V or VI of the Periodic Classification of the elements into contact with the alpha-olefin(s) and a very small amount of the activity retarder which is introduced continuously into the reactor at a flow rate which is varied with time, so as to keep substantially constant either the polymerization rate or the content of transition metal in the polymer produced.

The activity retarder is selected from a wide variety of products which are capable of reducing the polymerization rate of an alpha-olefin in the presence of a catalyst based on a transition metal. The activity retarder can be selected especially from polymerization inhibitors or from the poisons known for this type of reaction. Activity retarders which can be selected in particular are carbon monoxide, carbon dioxide, carbon disulphide, carbon oxysulphide, nitrogen oxides and peroxides, oxygen, alcohols, aldehydes, ketones, thiols and water. The activity retarder can also b selected from electron donor compounds capable of complexing the catalyst and reducing the polymerization rate, in particular from organic compounds containing at least one oxygen, sulphur, nitrogen and/or phosphorus atom. It can be selected from a wide variety of electron donor compounds such as amines, amides, phosphines, sulphoxides, sulphones, esters, ethers or thioethers.

It is particularly recommended to use an activity retarder in an amount which is capable of reducing the polymerization rate without substantially affecting the quality and the properties of the polymer manufactured, such as the melt index, the melt flow ratio, the average molecular weight, the molecular weight distribution or the stereo-specificity of the polymer. In fact, since it is the very principle of the present invention that the rate of introduction of the activity retarder into the reactor can vary with time, the properties of the polymer manufactured could vary considerably during the reaction if the activity retarder used had an important influence on the properties of the polymer. Such a result would be contrary to the object of the present invention. However, in view of the conditions under which the activity retarder is used in the process, especially the very small amount introduced into the reactor, the choice of activity retarder can still be made from a large number of products such as polymerization inhibitors and electron donor compounds. It is nevertheless preferable to use the conventional polymerization poisons, in particular alcohols, carbon monoxide, carbon dioxide or oxygen, as well as electron donor compounds, in particular amides and ethers. It has been found that excellent results are obtained with oxygen and amides.

The activity retarder can be used in the pure state or, preferably, diluted in gas such as nitrogen, or dissolved in a readily volatile liquid hydrocarbon. A further possibility is to use a mixture of two or more activity retarders. When oxygen is employed as an activity retarder, it may be employed mixed with nitrogen. In certain cases, atmospheric air or oxygen-depleted air may also be employed.

According to the present invention, the activity retarder has to be continuously introduced into the polymerization reactor. In practice, it is introduced into the reactor at the same time as the alpha-olefin(s), continuously or in an almost continuous, intermittent manner, so that the interruption time is so short that it cannot affect the polymerization rate which is kept substantially constant. If the introduction of the activity retarder is interrupted, or if the interruption time is too long, the activity of the polymerization catalyst in the reactor may increase because of the absence of the activity retarder, the polymerization rate is then no longer controlled and may change rapidly with the quality of the reactants or the catalyst and produce agglomerates.

It has also been found that the activity retarder is introduced into the reactor in an amount which is so small that it is not possible to measure the proportion of this retarder in the gaseous reaction mixture circulating through the reactor. The proportion of the activity retarder is much lower than 1 part by weight per million (ppm) and generally lower than 0.1 ppm. The amount of the activity retarder in the gaseous reaction mixture circulating through the reactor generally is not measurable by usual apparatus, such as an oxygen analyzer with electrochemical sensor, or a carbon monoxide/dioxide analyzer by gas chromatography with methanation furnace sensor, or an organic compound analyzer with thermo-ionic sensor. In practice, the amount of the activity retarder introduced into the reactor is such that the molar ratio of the amount of activity retarder introduced to the amount of alpha-olefins(s) introduced is $10^{-8}$ to $10^{-5}$, preferably $5 \times 10^{-8}$ to $2 \times 10^{-6}$, more particularly $10^{-7}$ to $10^{-6}$. It has been found, surprisingly, that the very small amount of activity retarder used is able to provide a polyolefin gas-phase process with a high productivity and a high reproducibility without forming agglomerates. The amount of activity retarder generally depends on the type of gas-phase polymerization system and on the type of catalyst used. The lowest amount of activity retarder to be used and consequently the minimum flow rate of introduction of activity retarder into the reactor may be easily determined by the maximum heat exchange of the gas-phase polymerization system or by the maximum polyolefin production without forming agglomerates. Furthermore, the highest amount of activity retarder to be used and hence the maximum flow rate of introduction of activity retarder into the reactor may be directly connected with the highest value of the concentration of impurities brought by the reactants into the reactor when the quality of reactants fluctuates. In particular, if the minimum flow rate of introduction of the activity retarder is too low, it has been observed that, during the polymerization, the polymer production can drop appreciably to a level such that the introduction of the activity retarder has to be stopped. In this case, the drop in production can become unavoidable and the content of catalyst residues in the polymer can increase significantly.

It has also been found that if the flow rate of introduction of the retarder is too high, i.e. if the molar ratio of the amount of activity retarder introduced to the amount of alpha-olefins introduced is excessive, the polymer production falls or the content of catalyst residues in the polymer can increase considerably.

According to the present invention, it has also been discovered that the flow rate of introduction of the activity retarder has to be varied with time in order to keep the polymerization rate substantially constant when slight fluctuations occur in the quality of the reactants or the catalyst or in the supply of catalyst to the reactor. It is estimated that a polymerization rate is considered to be substantially constant with time when the amount of polyolefin produced per hour does not vary by more than 5% by weight, preferably by more than 3% by weight.

In another variant of the process, it has also been discovered that the flow rate of introduction of the activity retarder can be modified with time in order to keep substantially constant the content of transition metal in the polymer produced when the quality of the reactants or the catalyst, or the supply of catalyst to the reactor, fluctuates during the polymerization. It is estimated that this content is considered to be substantially constant when the content by weight of transition metal in the polymer does not vary by more than 10%, preferably by more than 5%.

A gas-phase polymerization process is generally carried out by maintaining substantially constant operating conditions, such as the composition of the gaseous reaction mixture, the total pressure, the catalyst feeding rate, the height or the weight of the bed, the polymerization temperature and the gas velocity. Under these circumstances, the polymerization rate may be easily determined and calculated, because it is directly related to the polymer production, i.e. the rate of withdrawing of the polymer, or to the rate of introduction of alpha-olefin(s), or to the difference between inlet gas temperature and exit gas temperature when taking into account the rate of heat generation is directly related to polymer formation.

Thus, for example, when it is observed, during the polymerization, that the polyolefin production is tending to increase or that the content of transition metal in the polymer produced is tending to decrease, because of an unexpected drop in the impurities in the alpha-olefins introduced into the reactor, or because of using a new catalyst which is slightly more active than the previous one, or again because of a greater supply of catalyst to the reactor than was anticipated, the flow rate of introduction of the activity retarder is then increased so as to keep constant the polymerization rate, in particular the polymer production, or the content of transition metal in the polymer produced. If the flow rate is not varied or if this variation is too small, the adverse effects of superactivation will rapidly occur with the appearance of hot spots and agglomerates in the bed. Conversely, when it is observed, during the polymerization, that the polyolefin production is tending to decrease or that the content of transition metal in the polymer produced is tending to increase, the flow rate of introduction of the activity retarder is then reduced so as to keep constant the polymerization rate, in particular the polymer production, or the content of transition metal in the polymer produced. If the flow rate is not varied or if this variation is too small, the polymer production unavoidably falls and the content of transition metal in the polymer increases. It has been observed, surprisingly, that, by virtue of the process of the present invention, it is now possible to carry out a gas phase polymerization at higher temperatures and under higher alpha-olefin pressures than previously. One of the unexpected advantages of the process is that the polyolefin production can be increased to 20% without the risk of forming hot spots and agglomerates. By virtue of the continuous introduction of the activity retarder in a very small amount varying with time, it is now possible to produce polyolefins of an excellent quality with a high degree of reproducibility, despite substantial and unexpected variations in the quality of the reactants, the activity of the catalyst or the supply of catalyst to the reactor.

Another unexpected advantage of the present invention is that Polyolefins thus manufactured have an appreciably reduced content of transition metal and, consequently, are of a superior quality, without forming agglomerates. Another advantage of the process arises from the fact that control of the polymerization is not associated with measurement of the concentration of activity retarder in the polymerization medium, and that the polymer production can be regulated direct via the flow rate of introduction of the activity retarder without substantially changing all the other operating conditions.

By virtue of this process, it is also possible to use very high yield catalysts whose polymerization activity is particularly sensitive to slight variations in the polymerization conditions. These catalysts can be introduced into the reactor continuously or intermittently. It is possible to use more active catalysts, in particular catalysts of the Ziegler-Natta type based on magnesium, halogen, titanium and/or vanadium and/or zirconium. It is also possible to increase the activity of these catalysts by the addition of greater amounts of a cocatalyst selected from organometallic compounds of metals belonging to Groups I, II or III of the Periodic Table of the elements, in particular from organo-aluminium compounds.

It is also possible to use a modifier agent of the catalyst, in particular a selectivity agent, such as an aromatic ester or a silicon compound, which is introduced into the reactor continuously at a constant flow rate and in a determined constant molar ratio 1 with the transition metal of the catalyst. It is also possible to use a catalyst of high activity based on chromium oxide associated with a granular support based on a refractory oxide such as silica, alumina or aluminium silicate, and activated by a heat treatment at a temperature of at least 250° C. and at most the temperature at which the granular support may start to sinter, preferably at a temperature of between 350°C. and 1000° C.

The catalyst of high activity can be used direct as such or in the form of a prepolymer. The conversion to prepolymer is generally carried out by bringing the catalyst into contact with one or more alpha-olefins in amounts such that the prepolymer contains between 0.002 and 10 millimol of transition metal per gram. These reactants can also be brought into contact in the presence of an organometallic compound of a metal belonging to groups I, II or III of the Periodic Table of the elements, in amounts such that the molar ratio of the amount of metal in the said organometallic compound to the amount of transition metal is between 0.1 and 50, preferably between 0.5 and 20. The catalyst of high activity, used directly or after a prepolymerization step, is introduced continuously or intermittently into the fluidized and/or mechanically agitated bed reactor.

The polymerization is carried out continuously in a fluidized and/or mechanically agitated bed by techniques known per se and using equipment such as that described in French patent no. 2 207 145 or French patent no. 2 335 526. The process is very particularly suitable for very large industrial reactors in which the least variation in the polymerization rate can very rapidly lead to adverse effects such as the formation of agglomerates. The gaseous reaction mixture containing the alpha-olefin(s) to be polymerized is generally cooled by means of at least one heat exchanger located outside the reactor, before being recycled via a recycling line. The activity retarder can be introduced direct into the reactor, preferably into a zone of the reactor where the activity retarder is dispersed rapidly, for example underneath a fluidization grid. It can also be introduced into the line for recycling the gaseous reaction mixture or into the line for supplying the reactor with alpha-olefin(s). If the recycling line includes a means for separating the gas from the fine solid particles entrained with this gas, such as a cyclone, and a means for recycling these fine particles direct into the polymerization reactor, the activity retarder can be introduced at any point on the gas/solid separation means or on the means for recycling the fine particles.

The activity retarder may be advantageously introduced at two or more points, more particularly in the recycling line of the gaseous reaction mixture and in the gas/solid separation means, or the fine particle recycling line, or in the reactor, particularly in the upper part of the reactor.

The polymerization reaction is generally carried out under a pressure of 0.5 to 5 MPa and at a temperature of 0° to 135° C. The process is suitable for the polymerization of one or more alpha-olefins containing from 2 to 8 carbon atoms, in particular for the polymerization of ethylene or propylene. It is very particularly suitable for the copolymerization of ethylene with at least one alpha-olefin containing from 3 to 8 carbon atoms, or for the copolymerization of propylene with at least one alpha-olefin containing from 4 to 8 carbon atoms, if appropriate with ethylene and/or a non-conjugated diene. The gaseous reaction mixture can contain hydrogen and an inert gas selected for example from nitrogen, methane, ethane, propane, butane, isobutane or isopentane. When a fluidized-bed reactor is used, the fluidization speed of the gaseous reaction mixture passing through the bed is 2 to 10 times the minimum fluidization speed. The polymer manufactured is withdrawn from the reactor continuously or, preferably, intermittently.

EXAMPLE 1

The process is carried out in a fluidised-bed, gas-phase polymerization reactor consisting of a vertical cylinder of diameter 4.5 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a gas circulation compressor and with means of heat transfer. Opening into the gas recycling line there are, in particular, the feed lines for ethylene, 1-butene, hydrogen and nitrogen, which represent the main constituents of the gas reactions mixture passing through the fluidised bed.

Above the fluidisation grid, the reactor contains a fluidised bed consisting of 52 tonnes of a linear low density polyethylene powder being formed, consisting of particles with a mass average diameter of 0.7 mm. The gas reaction mixture, which contains, by volume 42% of ethylene, 18% of 1-butene, 8% of hydrogen and 32% of nitrogen, passes through the fluidised bed at a pressure of 2 MPa, at 80° C. and with an upward fluidised velocity of 0.5 m/s.

A catalyst which is identical with that described in Example 1 of French Patent No. 2,405,961, which contains magnesium, chlorine and titanium, and which has previously been converted into a prepolymer containing 40 g of polyethylene per millimol of titanium and a quantity of tri-n-octylaluminium (TnOA) such that the Al/Ti molar ratio is equal to $0.85 \pm 0.05$, is introduced into the reactor intermittently in the course of time. The flow rate of introduction of the prepolymer into the reactor is 150 kg/h.

A gas mixture containing 90% of nitrogen and 2% of oxygen by volume is introduced continuously during the polymerization into the ethylene feeding line connected to the polymerization reactor. The flow rate of the gas mixture containing oxygen varies with time between 62 g/h and 188 g/h, so as to maintain the output of linear low density of polyethylene at a constant value, equal to $13.5 \pm 0.4$ tonnes per hour, whatever the unavoidable fluctuations in the quality of the catalyst and that of the reactants employed in the process. Under these conditions, the oxygen content of the ethylene fed to the reactor varies with the time from 0.01 to 0.3 volumes per million (vpm) and the molar ratio of the amount of oxygen introduced to the amounts of ethylene and 1-butene introduced varies from $1 \times 10^{-7}$ to $3 \times 10^{-7}$. It has been ascertained that it is impossible to detect the presence of oxygen in the gas reaction mixture circulated through the fluidized bed (oxygen content being below 0.1 vpm). It has been noted that after a number of days of continuous polymerization under these conditions the polymer output has remained constant without formation of agglomerates and that the quality of the linear low density polyethylene manufactured in this way remains constant and satisfactory, despite the random variations in catalyst activity and the fluctuations, which are unforeseeable and difficult to detect, in the impurities introduced by ethylene, 1-butene and the other constituents of the gas reaction mixture. In particular, the carbon monoxide content of ethylene fed to the reactor generally fluctuates at a level below or close to 0.1 vpm.

EXAMPLE 2

(comparative)

The process is carried out under conditions which are exactly identical with those described in Example 1, except for the fact that no gas mixture containing oxygen is introduced into the ethylene fed to the polymerization reactor.

Under these conditions it is found very rapidly that the output of linear low density polyethylene varies with time between approximately 11.5 and 14.5 tonnes per hour and cannot be substantially kept constant, that the quality of the polymer manufactured fluctuates very markedly and that agglomerates of molten polymer are formed.

EXAMPLE 3

The process is carried out in a fluidised-bed, gas phase polymerisation reactor consisting of a vertical cylinder of diameter 0.9 m and height 6 m and surmounted by a velocity reduction chamber. In its lower part, the reactor is equipped with a fluidisation grid and an external line for recycling gas connecting the top of the velocity reduction chamber to the lower part of the reactor, situated under the fluidisation grid. The gas recycling line is equipped with a gas circulation compressor and means of heat transfer. Into the gas recycling line there open, in particular, the feed lines for ethylene, 1-butene, hydrogen and nitrogen, which represent the main constituents of the gas reaction mixture passing through the fluidised bed.

Above the fluidisation grid, the reactor contains a fluidised bed consisting of 400 kg of a linear low density polyethylene powder being formed, consisting of particles with a mass average diameter of 0.7 mm. The gas reaction mixture which contains 30% of ethylene, 12% of 1-butene, 6% of hydrogen and 51% of nitrogen and 1% of ethane by volume, passes through the fluidised bed at a pressure of 1.6 MPa, at 80° C. and with an upward fluidisation velocity of 0.5 m/s.

A catalyst which is identical with that described in Example 1 of French Patent No. 2,405,961, which contains magnesium, chlorine and titanium and which has previously been converted into a prepolymer containing 40 g of polyethylene per millimol of titanium and a quantity of tri-n-octylaluminium (TnOA) such that the Al/Ti molar ratio is equal to $1.85 + 0.05$, is introduced into the reactor intermittently in the course of time. The flow rate of introduction of the prepolymer into the reactor is 0.7 kg/h.

A solution of dimethylformamide (DMF) in isopentane, containing 0.004 mol of DMF per liter, is introduced continuously during the polymerization into the gas recycling line. The flow rate of this solution varies with time between 125 ml/h and 300 ml/h, so as to keep the output of linear low density polyethylene at a constant value equal to 100±3 kg per hour whatever the unavoidable fluctuations in the quality of the catalyst and that of the reactants employed in the process.

Under these conditions, the molar ratio of the amount of DMF introduced to the amounts of ethylene and 1-butene introduced varies from $1.5 \times 10^{-7}$ to $5 \times 10^{-7}$. It has been ascertained that it is impossible to detect the presence of DMF in the gas reaction mixture which circulates through the fluidised bed (DMF content being below 0.1 vpm). It has been noted that after several days of continuous polymerisation under these conditions the polymer output has remained constant without formation of agglomerates and that the quality of linear low density polyethylene manufactured in this way remains constant and satisfactory, despite the random variations in catalyst activity and the fluctuations, which are unforeseeable and difficult to detect, in the impurities introduced by ethylene, 1-butene and the other constituents of the gas reaction mixture. In particular, the carbon monoxide content of ethylene fed to the reactor generally fluctuates at a level below or close to 0.1 vpm.

We claim:

1. A process for the continuous gas phase polymerization of one or more alpha-olefins in a reactor having a fluidized and/or mechanically stirred bed which comprises polymerizing at least one alpha-olefin in the presence of a catalyst based on a transition metal belonging to Groups IV, V or VI of the Periodic Table of elements and continuously introducing into the reactor a very small amount of an activity retarder so that the amount of activity retarder in the gaseous mixture circulating in the reactor is less than 0.1 part per million by weight, said activity retarder being introduced at a flow rate which is varied in time in response to the polymerization rate or in response to the content of the transition metal in the polymer product so as to keep substantially constant either the polymerization rate or the content of transition metal in the polymer product.

2. Process according to claim 1, characterised in that the activity retarder is introduced into the reactor in an amount such that the molar ratio of the amount of activity retarder introduced to the amount of the alpha-olefin(s) introduced is from $10^{-8}$ to $10^{-5}$.

3. Process according to claim 1, characterised in that the activity retarder is selected from polymerization inhibitors and electron-donor compounds.

4. Process according to claim 3, characterised in that the polymerization inhibitor is selected from carbon monoxide, carbon dioxide, carbon disulphide, carbon oxysulphide, nitrogen oxides and peroxides, alcohols, thiols, aldehydes, ketones, oxygen and water.

5. Process according to claim 3, characterised in that the electron donor compound is selected from amines, amides, phosphines, sulphoxides, sulphones, esters, ethers and thioethers.

6. Process according to claim 1, characterised in that the catalyst is a catalyst of the Ziegler-Natta type based on magnesium, halogen, titanium and/or vanadium and/or zirconium.

7. Process according to claim 1, characterised in that the catalyst is based on chromium oxide combined with a granular support based on a refractory oxide and activated by a heat treatment.

8. Process according to claim 1, characterised in that the alpha-olefin(s) contain from 2 to 8 carbon atoms.

9. Process according to claim 1, characterised in that the polymerisation is carried out at a pressure from 0.5 to 5 MPa and at a temperature from 0° to 135° C.

10. A process according to claim 1, wherein the gas phase polymerization is carried out while maintaining substantially constant operating conditions.

11. A process according to claim 6 wherein the activity retarder is oxygen, dimethyl formamide or carbon dioxide.

12. A process according to claim 7 wherein the activity retarder is carbon monoxide, oxygen, or water.

13. A process as defined in claim 6 or 7 wherein the activity retarder is oxygen or an amide.

14. A process as defined in claim 6 wherein the activity retarder is oxygen or dimethyl formamide.

* * * * *

UNITED STATES PATENT AND TRADEMARK OFFICE
CERTIFICATE OF CORRECTION

PATENT NO. : 5,066,736

DATED : November 19, 1991

INVENTOR(S) : ANDRE DUMAIN et al

It is certified that error appears in the above-identified patent and that said Letters Patent is hereby corrected as shown below:

Col. 1, l. 59, correct the spelling of the word "and"

Col. 2, l. 68, after "also" change "b" to --be--

Col. 3, l. 57, correct the spelling of the word "possible"

Col. 5, l. 47, correct the spelling of the word "polyolefins"

Col. 6, l. 8, should read "molar ratio with"

Col. 8, lines 43-44, correct the spelling of the word "represent"
Col. 9, line 37:
Claim 1, line 10, change "part" to --parts--

Signed and Sealed this

Sixteenth Day of March, 1993

Attest:

STEPHEN G. KUNIN

*Attesting Officer*　　　Acting Commissioner of Patents and Trademarks